US012610329B2

(12) United States Patent
Arvola et al.

(10) Patent No.: US 12,610,329 B2
(45) Date of Patent: Apr. 21, 2026

(54) ADJUSTING A CLIENT DEVICE RECEIVER PARAMETER, AND RELATED DEVICES, METHODS AND COMPUTER PROGRAMS

(71) Applicant: Nokia Technologies Oy, Espoo (FI)

(72) Inventors: Antti Arvola, Oulu (FI); Italo Atzeni, Oulu (FI); Bikshapathi Gouda, Oulu (FI); Antti Tölli, Oulu (FI); Juha Pekka Karjalainen, Oulu (FI); Sami-Jukka Hakola, Oulu (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 295 days.

(21) Appl. No.: 18/483,216

(22) Filed: Oct. 9, 2023

(65) Prior Publication Data

US 2024/0129865 A1      Apr. 18, 2024

(30) Foreign Application Priority Data

Oct. 14, 2022    (FI) ..................................... 20225934

(51) Int. Cl.
*H04W 52/52*        (2009.01)
*H04W 52/24*        (2009.01)

(52) U.S. Cl.
CPC ......... *H04W 52/52* (2013.01); *H04W 52/245* (2013.01)

(58) Field of Classification Search
CPC ..... H04W 52/52; H04W 52/245; H04W 8/24; H03M 1/007; H04B 1/0007
(Continued)

(56) References Cited

U.S. PATENT DOCUMENTS 8,320,865 B2    11/2012  Bjork
8,849,224 B2    9/2014   Bjork
(Continued)

FOREIGN PATENT DOCUMENTS

CN        102132502 A    7/2011
CN        104967470 A    10/2015
(Continued)

OTHER PUBLICATIONS

Office action received for corresponding Chinese Patent Application No. 201980101925.6, dated Feb. 7, 2024, 7 pages of office action and no page of translation available.
(Continued)

*Primary Examiner* — Eugene Yun
(74) *Attorney, Agent, or Firm* — Carter, DeLuca & Farrell LLP

(57)        ABSTRACT

Devices, methods and computer programs for adjusting a client device receiver parameter are disclosed. A client device (200) transmits to a network node device (210) a first capability indication indicating at least a low-resolution analog-to-digital converter capability of the client device (200), and a second capability indication indicating whether the client device (200) is capable of receiving signal information associated with low-resolution receiver processing. Based on these, the network node device (210) may determine that adjusting at least one receiver parameter of the client device (200) is needed, generate and transmit network assistance information and signal information to the client device (200) for use in adjusting at least one receiver parameter of the client device (200). The client device (200) may then perform power measurements of the received signal information and adjust receiver parameter(s) of the client device (200) accordingly.

1 Claim, 6 Drawing Sheets

(58) Field of Classification Search
USPC ........................................................ 455/522
See application file for complete search history.

(56) References Cited

U.S. PATENT DOCUMENTS

| | | |
|---|---|---|
| 2012/0099666 A1 | 4/2012 | Baldemair et al. |
| 2013/0010841 A1 | 1/2013 | Seo et al. |
| 2015/0016314 A1 | 1/2015 | Phan Huy |
| 2015/0280801 A1 | 10/2015 | Xin et al. |
| 2017/0237465 A1 | 8/2017 | Zhou et al. |
| 2021/0037445 A1 | 2/2021 | Abedini et al. |
| 2022/0190837 A1 | 6/2022 | Horn et al. |
| 2022/0190838 A1 | 6/2022 | Horn et al. |
| 2022/0256468 A1* | 8/2022 | Zou ................... H04W 52/0245 |

FOREIGN PATENT DOCUMENTS

| | | |
|---|---|---|
| CN | 107566021 A | 1/2018 |
| CN | 108199753 A | 6/2018 |
| CN | 108712196 A | 10/2018 |
| CN | 108712198 A | 10/2018 |
| EP | 3306828 A1 | 4/2018 |
| EP | 3878146 A1 | 9/2021 |
| EP | 3949137 A1 | 2/2022 |
| WO | 2009/062909 A1 | 5/2009 |
| WO | 2016/120443 A1 | 8/2016 |
| WO | 2018/122855 A1 | 7/2018 |
| WO | 2020/093203 A1 | 5/2020 |
| WO | 2020/191591 A1 | 10/2020 |

OTHER PUBLICATIONS

Jing et al., "SINR-Based Antenna Combining for Limited Feedback SDMA", Journal of Electronics & Information Technology, vol. 31, No. 11, Nov. 2009, pp. 2692-2696.
Balatsoukas-Stimming et al., "Deep Unfolding for Communications Systems: A Survey and Some New Directions", arxiv, Jun. 13, 2019, 6 pages.
Extended European Search Report received for corresponding European Patent Application No. 23202574.2, dated Mar. 27, 2024, 9 pages.
Zhu et al., "Cubic Metric Reduction in OFDM Systems by Iterative Descendent Clipping and Filtering", IEEE Global Communications Conference (Globecom), Dec. 9-13, 2013, pp. 4181-4185.
Studer et al., "PAR-Aware Large-Scale Multi-User MIMO-OFDM Downlink", IEEE Journal on Selected Areas in Communications, vol. 31, No. 2, Feb. 2013, pp. 303-313.
Wang et al., "Convex optimization based downlink precoding for large-scale Mimo", IEEE Wireless Communications and Networking Conference (WCNC), Apr. 6-9, 2014, pp. 218-223.
Bao et al., "An Efficient Bayesian PAPR Reduction Method for OFDM-Based Massive MIMO Systems", IEEE Transactions on Wireless Communications, vol. 15, No. 6, Jun. 2016, pp. 4183-4195.
Fatema et al., "Massive MIMO Linear Precoding: A Survey", IEEE Systems Journal, vol. 12, No. 4, Dec. 2018, pp. 3920-3931.
Jacobsson et al., "Quantized Precoding for Massive MU-MIMO", IEEE Transactions on Communications, vol. 65, No. 11, Nov. 2017, pp. 4670-4684.
Jacobsson et al., "Nonlinear 1-Bit Precoding for Massive MU-MIMO with Higher-Order Modulation", 50th Asilomar Conference on Signals, Systems and Computers, Nov. 6-9, 2016, pp. 763-767.
Castañeda et al., "1-bit Massive MU-MIMO Precoding in VLSI", IEEE Journal on Emerging and Selected Topics in Circuits and Systems, vol. 7, No. 4, Dec. 2017, pp. 508-522.
Wang et al., "Finite-Alphabet Precoding for Massive MU-MIMO with Low-resolution DACs", IEEE Transactions on Wireless Communications, vol. 17, No. 7, Jul. 2018, pp. 4706-4720.
International Search Report and Written Opinion received for corresponding Patent Cooperation Treaty Application No. PCT/CN2019/114495, dated Jul. 15, 2020, 9 pages.

Yi et al., "Normalization Precoding Algorithm of Massive MU-MIMO System", Video Engineering, vol. 39, No. 19, 2015, pp. 38-42.
Chen et al., "Joint Antenna Selection and User Scheduling for Massive Multiuser MIMO Systems With Low-Resolution ADCs", IEEE Transactions on Vehicular Technology, vol. 68, No. 1, Jan. 2019, pp. 1019-1024.
"3rd Generation Partnership Project; Technical Specification Group Radio Access Network; NR; Radio Resource Control (RRC) protocol specification (Release 15)", 3GPP TS 38.331, V15.13.0, Mar. 2021, pp. 1-540.
"Are 1-bit ADCs Meaningful?", Wireless Future Blog, Retrieved on Oct. 22, 2023, Webpage available at : https://ma-mimo.ellintech.se/2018/06/05/are-1-bit-adcs-meaningful/.
Holma et al., "Extreme massive MIMO for macro cell capacity boost in 5G-Advanced and 6G", Nokia Bell Labs, White Paper, Oct. 1, 2021, 14 pages.
Li et al., "Channel estimation and performance analysis of one-bit massive MIMO systems", IEEE Transactions on Signal Processing, vol. 65, No. 15, Aug. 1, 2017, pp. 4075-4089.
Jacobsson et al., "Throughput analysis of massive MIMO uplink with low-resolution ADCs", IEEE Transactions on Wireless Communications, vol. 16, No. 6, Jun. 2017, pp. 4038-4051.
Studer et al., "Quantized massive MU-MIMO-OFDM uplink", IEEE Transactions on Communications, vol. 64, No. 6, Jun. 2016, pp. 2387-2399.
Roth et al., "A comparison of hybrid beamforming and digital beamforming with low-resolution ADCs for multiple users and imperfect CSI", IEEE Journal of Selected Topics in Signal Processing, vol. 12, No. 3, Jun. 2018, pp. 484-498.
Atzeni et al., "Channel estimation and data detection analysis of massive MIMO with 1-bit ADCs", arXiv, Nov. 16, 2021, pp. 1-17.
"When Will Hybrid Beamforming Disappear?", Wireless Future Blog, Retrieved on Oct. 23, 2023, Webpage available at : https://ma-mimo.ellintech.se/2019/05/02/when-will-hybrid-beamforming-disappear/.
"Moderator's summary for discussion [RAN94e-R18Prep-08] AI/ML for Air Interface", 3GPP TSG RAN Meeting #94-e, RP-212668, Agenda: 8A.1, Qualcomm, Dec. 6-17, 2021, 77 pages.
Chandran et al., "A Novel Method for Pilot Pattern Selection in 5G NR Systems", IEEE Wireless Communications and Networking Conference (WCNC), Mar. 29-Apr. 1, 2021, 6 pages.
Saikrishna et al., "Deep Learning Based Channel Estimation with Flexible Delay and Doppler Networks for 5G NR", IEEE Wireless Communications and Networking Conference (WCNC), Mar. 29-Apr. 1, 2021, 6 pages.
Ji et al., "Compressed Channel Estimation for Point-to-Point Millimeter-Wave Communications", IEEE Globecom Workshops (GC Wkshps), Dec. 9-13, 2019, 5 pages.
Finnish Application No. FI 20225936, "Client Device and Netwo Node Device", filed on Oct. 14, 2022, pp. 1-48.
International Search Report and Written Opinion received for corresponding Patent Cooperation Treaty Application No. PCT/US2021/071314, dated May 27, 2022, 24 pages.
Lin et al., "A Primer on Bandwidth Parts in 5G New Radio", arXiv, Apr. 2, 2020, pp. 1-7.
"PSD imbalance in inter-band DL CA", 3GPP TSG-RAN WG4 Meeting #94-e, R4-2000395, Agenda: 8.14.1.7, Intel Corporation, Feb. 24-Mar. 6, 2020, pp. 1-5.
"On absolute level ACLR for mm-wave bands", 3GPP TSG-RAN WG4 #84, R4-1708123, Agenda: 9.3.5.2, Ericsson, Aug. 21-25, 2017, pp. 1-3.
"Physical layer UE capability aspects of broadcast/unicast superposition", 3GPP TSG RAN WG1 Meeting #46bis, R1-062539, Agenda: 6.14, Samsung, Oct. 9-13, 2006, pp. 1-4.
Office action received for corresponding Finnish Patent Application No. 20225934, dated Mar. 20, 2023, 8 pages.
Zhang et al., "On Low-Resolution ADCs in Practical 5G Millimeter-Wave Massive MIMO Systems", IEEE Communications Magazine, vol. 56, No. 7, Jul. 2018, pp. 205-211.
Extended European Search Report received for corresponding European Patent Application No. 19951025.6, dated Jun. 5, 2023, 8 pages.

(56)  References Cited

OTHER PUBLICATIONS

Chen, "Efficient Constant Envelope Precoding With Quantized Phases for Massive MU-MIMO Downlink Systems", IEEE Transactions on Vehicular Technology, vol. 68, No. 4, Apr. 2019, pp. 4059-4063.

Khojastepour et al., "Quantized linear MIMO precoding for multiuser downlink systems", 42nd Annual Conference on Information Sciences and Systems, Mar. 19-21, 2008, pp. 978-983.

Notice of Allowance received for corresponding U.S. Appl. No. 17/772,569, dated Oct. 3, 2023, 10 pages.

Office action received for corresponding Chinese Patent Application No. 201980101925.6, dated Nov. 15, 2024, 3 pages of office action and 5 pages of translation available.

Notice of Allowance received for corresponding Chinese Patent Application No. 201980101925.6, dated Mar. 10, 2025, 5 pages of Notice of Allowance and no page of translation available.

Wang et al., "Precoding and Pilot Scheduling in Very Large MIMO Multi-Cell TDD Systems", Journal of Signal Processing, vol. 29, No. 08, Aug. 2013, pp. 915-924.

Notice of Allowance received for corresponding European Patent Application No. 23202574.2, dated Jun. 10, 2025, 8 pages.

* cited by examiner

200

210

110

100

200

210

ADJUSTING A CLIENT DEVICE RECEIVER PARAMETER, AND RELATED DEVICES, METHODS AND COMPUTER PROGRAMS

TECHNICAL FIELD

The disclosure relates generally to communications and, more particularly but not exclusively, to adjusting a client device receiver parameter, as well as related devices, methods and computer programs.

BACKGROUND

To support the exponential growth in mobile data traffic and meet the quality-of-service requirements of emerging wireless applications (such as autonomous mobility and augmented/mixed reality), systems beyond fifth generation (5G) wireless networks are expected to exploit the large amount of bandwidth available in the sub-THz (terahertz) band (e.g., 0.1-1 THz). At least in some situations, this calls for antenna arrays with thousands of fully digital antennas at the base station or gNB. In this setting, the power consumed by each analog-to-digital converter (ADC)/digital-to-analog converter (DAC) may scale linearly with a sampling rate and exponentially with a number of quantization bits. Furthermore, the volume of raw data exchanged between a remote radio head and a base-band unit may scale linearly with both the sampling rate and the number of quantization bits.

Accordingly, at least in some situations, there may be a need for adopting low-resolution ADCs/DACs to reduce the hardware power consumption and complexity at millimeter wave (mmWave) and sub-THz frequencies.

However, at least in some situations, operating with low-resolution ADCs/DACs may require higher granularity in the antenna domain (for the data transmission/reception) and in the time domain (for the channel estimation). Furthermore, a proper operating signal-to-noise ratio (SNR) may be needed in order to minimize performance loss caused by the quantization.

In other words, unlike a traditional multiple-input and multiple-output (MIMO) system with high-resolution ADCs, the low-resolution ADCs may need to operate at an appropriate SNR level in order for different amplitude levels in a transmit modulation coding scheme (MCS) to be distinguishable.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor, and at least one memory storing instructions that, when executed by the at least one processor, cause the client device at least to perform transmitting, to a network node device, a first capability indication indicating at least a low-resolution analog-to-digital converter, ADC, capability of the client device. The instructions, when executed by the at least one processor, further cause the client device at least to perform transmitting, to the network node device, a second capability indication indicating whether the client device is capable of receiving signal information associated with low-resolution receiver processing. The instructions, when executed by the at least one processor, further cause the client device at least to perform receiving, from the network node device, network assistance information generated based on the transmitted first capability indication and second capability indication. The instructions, when executed by the at least one processor, further cause the client device at least to perform receiving, from the network node device, signal information based on the transmitted first capability indication and second capability indication. The instructions, when executed by the at least one processor, further cause the client device at least to perform power measurements of the received signal information. The instructions, when executed by the at least one processor, further cause the client device at least to perform adjusting at least one receiver parameter of the client device based on the received network assistance information and the performed power measurements of the received signal information.

In an example embodiment, alternatively or in addition to the above-described example embodiments, the received network assistance information comprises information about resources and modulation for the receiving of the signal information.

In an example embodiment, alternatively or in addition to the above-described example embodiments, the first capability indication further indicates a convergence speed of an automatic gain control, AGC, of the client device.

In an example embodiment, alternatively or in addition to the above-described example embodiments, the receiving of the signal information comprises receiving signal information resources at a time interval dependent on the indicated convergence speed of the AGC of the client device.

In an example embodiment, alternatively or in addition to the above-described example embodiments, the at least one receiver parameter of the client device comprises a parameter related to the AGC of the client device.

In an example embodiment, alternatively or in addition to the above-described example embodiments, the adjusting of the at least one receiver parameter of the client device comprises adjusting a level of the AGC to determine a range for pre-ADC amplification in which the performed power measurements of the received signal information resources are not saturated.

In an example embodiment, alternatively or in addition to the above-described example embodiments, the receiving of the signal information comprises receiving a series of signal information resources in time domain with an increasing amplitude profile, and the adjusting of the at least one receiver parameter of the client device comprises adjusting the at least one receiver parameter of the client device in steps dependent on the performed power measurements of the received signal information resources.

In an example embodiment, alternatively or in addition to the above-described example embodiments, the receiving of the signal information comprises receiving a series of signal information resources in time domain with a constant power, and the adjusting of the at least one receiver parameter of the client device comprises adjusting the at least one receiver parameter of the client device between the performed power measurements of the received signal information resources with constant steps.

In an example embodiment, alternatively or in addition to the above-described example embodiments, the receiving of the signal information comprises receiving a series of signal information resources in time domain with an increasing amplitude profile, and the adjusting of the at least one receiver parameter of the client device comprises adjusting the at least one receiver parameter of the client device between the performed power measurements of the received signal information resources with constant steps.

In an example embodiment, alternatively or in addition to the above-described example embodiments, the low-resolution ADC capability of the client device comprises a capability for an ADC with one to four quantization bits.

In an example embodiment, alternatively or in addition to the above-described example embodiments, the signal information comprises at least one of a signal, a reference signal, a channel with data, or a channel with control information.

In an example embodiment, alternatively or in addition to the above-described example embodiments, the signal information comprises multi-amplitude modulated signal information.

An example embodiment of a client device comprises means for performing causing the client device to transmit, to a network node device, a first capability indication indicating at least a low-resolution analog-to-digital converter, ADC, capability of the client device. The means are further configured to perform causing the client device to transmit, to the network node device, a second capability indication indicating whether the client device is capable of receiving signal information associated with low-resolution receiver processing. The means are further configured to perform causing the client device to receive, from the network node device, network assistance information generated based on the transmitted first capability indication and second capability indication. The means are further configured to perform causing the client device to receive, from the network node device, signal information based on the transmitted first capability indication and second capability indication. The means are further configured to perform causing the client device to perform power measurements of the received signal information. The means are further configured to perform causing the client device to adjust at least one receiver parameter of the client device based on the received network assistance information and the performed power measurements of the received signal information.

In an example embodiment, alternatively or in addition to the above-described example embodiments, the received network assistance information comprises information about resources and modulation for the receiving of the signal information.

In an example embodiment, alternatively or in addition to the above-described example embodiments, the first capability indication further indicates a convergence speed of an automatic gain control, AGC, of the client device.

In an example embodiment, alternatively or in addition to the above-described example embodiments, the receiving of the signal information comprises receiving signal information resources at a time interval dependent on the indicated convergence speed of the AGC of the client device.

In an example embodiment, alternatively or in addition to the above-described example embodiments, the at least one receiver parameter of the client device comprises a parameter related to the AGC of the client device.

In an example embodiment, alternatively or in addition to the above-described example embodiments, the adjusting of the at least one receiver parameter of the client device comprises adjusting a level of the AGC to determine a range for pre-ADC amplification in which the performed power measurements of the received signal information resources are not saturated.

In an example embodiment, alternatively or in addition to the above-described example embodiments, the receiving of the signal information comprises receiving a series of signal information resources in time domain with an increasing amplitude profile, and the adjusting of the at least one receiver parameter of the client device comprises adjusting the at least one receiver parameter of the client device in steps dependent on the performed power measurements of the received signal information resources.

In an example embodiment, alternatively or in addition to the above-described example embodiments, the receiving of the signal information comprises receiving a series of signal information resources in time domain with a constant power, and the adjusting of the at least one receiver parameter of the client device comprises adjusting the at least one receiver parameter of the client device between the performed power measurements of the received signal information resources with constant steps.

In an example embodiment, alternatively or in addition to the above-described example embodiments, the receiving of the signal information comprises receiving a series of signal information resources in time domain with an increasing amplitude profile, and the adjusting of the at least one receiver parameter of the client device comprises adjusting the at least one receiver parameter of the client device between the performed power measurements of the received signal information resources with constant steps.

In an example embodiment, alternatively or in addition to the above-described example embodiments, the low-resolution ADC capability of the client device comprises a capability for an ADC with one to four quantization bits.

In an example embodiment, alternatively or in addition to the above-described example embodiments, the signal information comprises at least one of a signal, a reference signal, a channel with data, or a channel with control information.

In an example embodiment, alternatively or in addition to the above-described example embodiments, the signal information comprises multi-amplitude modulated signal information.

An example embodiment of a method comprises transmitting, from a client device to a network node device, a first capability indication indicating at least a low-resolution analog-to-digital converter, ADC, capability of the client device. The method further comprises transmitting, from the client device to the network node device, a second capability indication indicating whether the client device is capable of receiving signal information associated with low-resolution receiver processing. The method further comprises receiving, at the client device from the network node device, network assistance information generated based on the transmitted first capability indication and second capability indication. The method further comprises receiving, at the client device from the network node device, signal information based on the transmitted first capability indication and second capability indication. The method further comprises performing, by the client device, power measurements of the received signal information. The method further comprises adjusting, by the client device, at least one receiver parameter of the client device based on the received network assistance information and the performed power measurements of the received signal information.

In an example embodiment, alternatively or in addition to the above-described example embodiments, the received network assistance information comprises information about resources and modulation for the receiving of the signal information.

In an example embodiment, alternatively or in addition to the above-described example embodiments, the first capability indication further indicates a convergence speed of an automatic gain control, AGC, of the client device.

In an example embodiment, alternatively or in addition to the above-described example embodiments, the receiving of the signal information comprises receiving signal information resources at a time interval dependent on the indicated convergence speed of the AGC of the client device.

In an example embodiment, alternatively or in addition to the above-described example embodiments, the at least one receiver parameter of the client device comprises a parameter related to the AGC of the client device.

In an example embodiment, alternatively or in addition to the above-described example embodiments, the adjusting of the at least one receiver parameter of the client device comprises adjusting a level of the AGC to determine a range for pre-ADC amplification in which the performed power measurements of the received signal information resources are not saturated.

In an example embodiment, alternatively or in addition to the above-described example embodiments, the receiving of the signal information comprises receiving a series of signal information resources in time domain with an increasing amplitude profile, and the adjusting of the at least one receiver parameter of the client device comprises adjusting the at least one receiver parameter of the client device in steps dependent on the performed power measurements of the received signal information resources.

In an example embodiment, alternatively or in addition to the above-described example embodiments, the receiving of the signal information comprises receiving a series of signal information resources in time domain with a constant power, and the adjusting of the at least one receiver parameter of the client device comprises adjusting the at least one receiver parameter of the client device between the performed power measurements of the received signal information resources with constant steps.

In an example embodiment, alternatively or in addition to the above-described example embodiments, the receiving of the signal information comprises receiving a series of signal information resources in time domain with an increasing amplitude profile, and the adjusting of the at least one receiver parameter of the client device comprises adjusting the at least one receiver parameter of the client device between the performed power measurements of the received signal information resources with constant steps.

In an example embodiment, alternatively or in addition to the above-described example embodiments, the low-resolution ADC capability of the client device comprises a capability for an ADC with one to four quantization bits.

In an example embodiment, alternatively or in addition to the above-described example embodiments, the signal information comprises at least one of a signal, a reference signal, a channel with data, or a channel with control information.

In an example embodiment, alternatively or in addition to the above-described example embodiments, the signal information comprises multi-amplitude modulated signal information.

An example embodiment of a computer program comprises instructions for causing a client device to perform at least the following: transmitting, to a network node device, a first capability indication indicating at least a low-resolution analog-to-digital converter, ADC, capability of the client device; transmitting, to the network node device, a second capability indication indicating whether the client device is capable of receiving signal information associated with low-resolution receiver processing; receiving, from the network node device, network assistance information generated based on the transmitted first capability indication and second capability indication; receiving, from the network node device, signal information based on the transmitted first capability indication and second capability indication; performing power measurements of the received signal information; and adjusting at least one receiver parameter of the client device based on the received network assistance information and the performed power measurements of the received signal information.

An example embodiment of a network node device comprises at least one processor, and at least one memory storing instructions that, when executed by the at least one processor, cause the network node device at least to perform receiving, from a client device, a first capability indication indicating at least a low-resolution analog-to-digital converter, ADC, capability of the client device. The instructions, when executed by the at least one processor, further cause the network node device at least to perform receiving, from the client device, a second capability indication indicating whether the client device is capable of receiving signal information associated with low-resolution receiver processing. The instructions, when executed by the at least one processor, further cause the network node device at least to perform, in response to determining that adjusting at least one receiver parameter of the client device is needed, generating network assistance information based on the received first capability indication and second capability indication. The instructions, when executed by the at least one processor, further cause the network node device at least to perform transmitting, to the client device, the generated network assistance information. The instructions, when executed by the at least one processor, further cause the network node device at least to perform transmitting, to the client device, signal information based on the received first capability indication and second capability indication for use in adjusting at least one receiver parameter of the client device.

An example embodiment of a network node device comprises means for performing causing the network node device to receive, from a client device, a first capability indication indicating at least a low-resolution analog-to-digital converter, ADC, capability of the client device. The means are further configured to perform causing the network node device to receive, from the client device, a second capability indication indicating whether the client device is capable of receiving signal information associated with low-resolution receiver processing. The means are further configured to perform, in response to determining that adjusting at least one receiver parameter of the client device is needed, generating network assistance information based on the received first capability indication and second capability indication. The means are further configured to perform causing the network node device to transmit, to the client device, the generated network assistance information. The means are further configured to perform causing the network node device to transmit, to the client device, signal information based on the received first capability indication and second capability indication for use in adjusting at least one receiver parameter of the client device.

An example embodiment of a method comprises receiving, at a network node device from a client device, a first capability indication indicating at least a low-resolution analog-to-digital converter, ADC, capability of the client device. The method further comprises receiving, at the network node device from the client device, a second capability indication indicating whether the client device is capable of receiving signal information associated with low-resolution receiver processing. The method further comprises, in response to determining, by the network node device, that adjusting at least one receiver parameter of the client device is needed, generating, by the network node device, network assistance information based on the received first capability indication and second capability indication. The method further comprises transmitting, from the network node device to the client device, the generated network assistance information. The method further comprises transmitting, from the network node device to the client device, signal information based on the received first capability indication and second capability indication for use in adjusting at least one receiver parameter of the client device.

An example embodiment of a computer program comprises instructions for causing a network node device to perform at least the following: receiving, from a client device, a first capability indication indicating at least a low-resolution analog-to-digital converter, ADC, capability of the client device; receiving, from the client device, a second capability indication indicating whether the client device is capable of receiving signal information associated with low-resolution receiver processing; in response to determining that adjusting at least one receiver parameter of the client device is needed, generating network assistance information based on the received first capability indication and second capability indication; transmitting, to the client device, the generated network assistance information; and transmitting, to the client device, signal information based on the received first capability indication and second capability indication for use in adjusting at least one receiver parameter of the client device.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
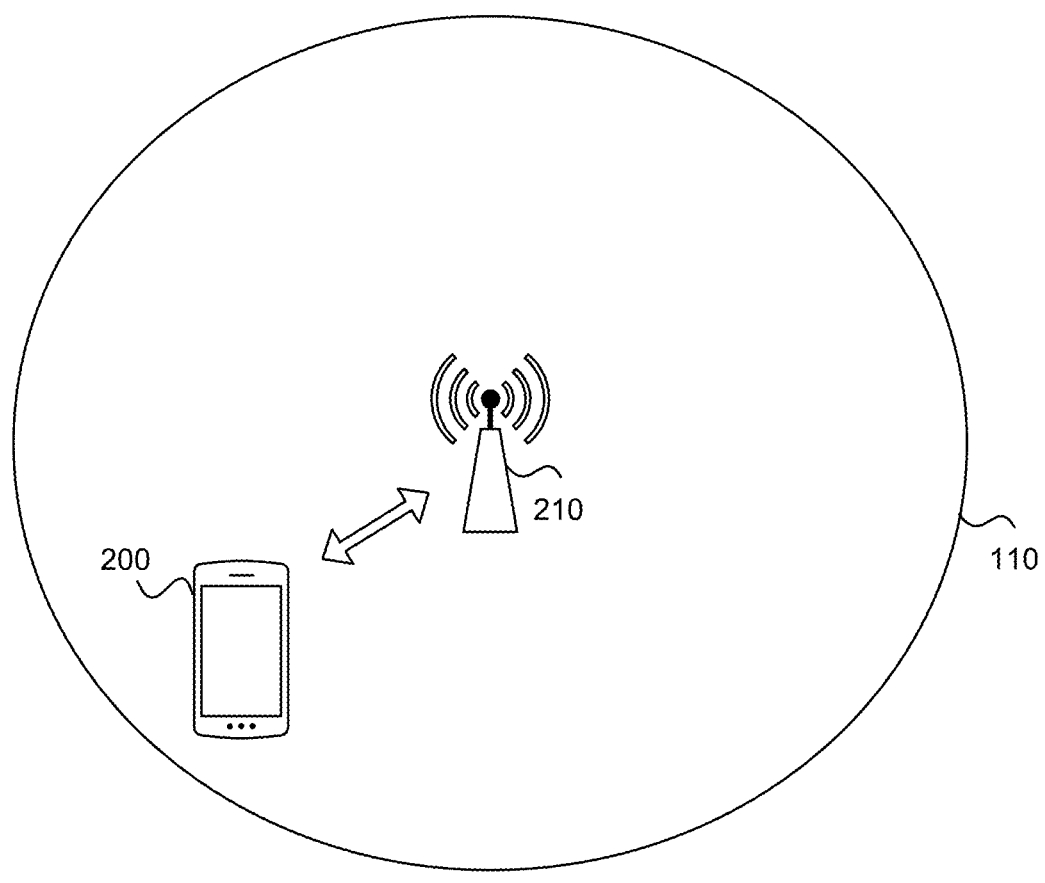
FIG. 1 shows an example embodiment of the subject matter described herein illustrating an example system, where various embodiments of the present disclosure may be implemented.
Figure 1:
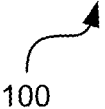

FIG. 1 illustrates an example system 100, where various embodiments of the present disclosure may be implemented. The system 100 may comprise a fifth generation (5G) new radio (NR) network or a system beyond 5G wireless networks, 110. An example representation of the system 100 is shown depicting a client device 200 and a network node device 210. At least in some embodiments, the network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the network 110 may be configured to serve diverse service types and/or use cases, and it may logically be seen as comprising one or more networks.

The client device 200 may include, e.g., a mobile phone, a smartphone, a tablet computer, a smart watch, or any hand-held, portable and/or wearable device. The client device 200 may also be referred to as a user equipment (UE). The network node device 210 may comprise a base station. The base station may include, e.g., any device suitable for providing an air interface for client devices to connect to a wireless network via wireless transmissions.

In the following, various example embodiments will be discussed. At least some of these example embodiments described herein may allow adjusting a client device receiver parameter.

At least some of the example embodiments described herein may allow a training or tuning or adjusting procedure to tune a receiver signal-to-noise ratio (SNR) of the client device 200 to an appropriate level. As will be discussed in more detail below, the training procedure may be based on, e.g., reference (e.g., pilot) signal power measurements via a transmit scheme with high pilot density, that the client device 200 can measure and use to adjust the automatic gain control (AGC) accordingly. As a low-resolution analog-to-digital converter (ADC) may cause a received reference signal power to saturate at too high SNR, the client device 200 may 'add noise' by adjusting the AGC level and find a range for a pre-ADC amplification where the received reference signal power is not saturated.

As the client device 200 may need to keep adjusting its AGC level while measuring the reference signal power with the new level, at least in some embodiments the tuning procedure may be applied during connected-mode operation.

In other words, at least in some embodiments a proper SNR level may be required in order to, e.g., utilize multi-amplitude modulations when using low-resolution ADCs at the client device 200. To find the correct SNR, the client device 200 may need to adjust the antenna-wise gain preceding the low-resolution ADC to 'add noise' to the received signal and prevent clipping/saturation of the signal. At least some of the example embodiments described herein may allow a scheme and associated signaling that enables AGC and ADC threshold training at the client device 200, through high-density transmission of pilots (for example, using channel status information reference signal (CSI-RS) resources) that the client device 200 may measure, e.g., between AGC adjustments. The transmission and measurement of pilots may happen, e.g., in time-domain.

Figure 2A:
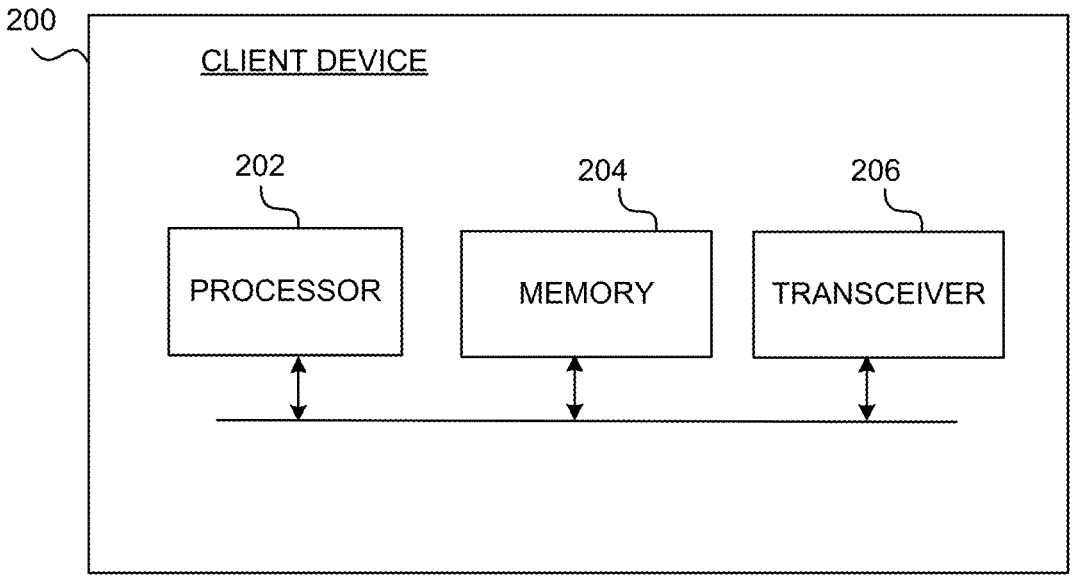
FIG. 2A shows an example embodiment of the subject matter described herein illustrating a client device.

FIG. 2A is a block diagram of the client device 200, in accordance with an example embodiment.

The client device 200 comprises one or more processors 202 and one or more memories 204 that comprise computer program code. The client device 200 may also include other elements, such as a transceiver 206 configured to enable the client device 200 to transmit and/or receive information to/from other devices, as well as other elements not shown in FIG. 2A. In one example, the client device 200 may use the transceiver 206 to transmit or receive signaling information and data in accordance with at least one cellular communication protocol. The transceiver 206 may be configured to provide at least one wireless radio connection, such as for example a 3GPP mobile broadband connection (e.g., 5G or beyond). The transceiver 206 may comprise, or be configured to be coupled to, at least one antenna to transmit and/or receive radio frequency signals.

Although the client device 200 is depicted to include only one processor 202, the client device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may comprise any of various types of devices used directly by an end user entity and capable of communication in a wireless network, such as user equipment (UE). Such devices include but are not limited to smartphones, tablet computers, smart watches, lap top computers, internet-of-things (IoT) devices, massive machine-to-machine (M2M) devices, massive machine type communications (mMTC) devices, industrial internet-of-things (IIoT) devices, enhanced mobile broadband (eMBB) devices, ultra-reliable low-latency communication (URLLC) devices, devices mounted in vehicles, etc.

When executed by the at least one processor 202, instructions stored in the at least one memory 204 cause the client device 200 at least to perform transmitting, to the network node device 210, a first capability indication indicating at least a low-resolution analog-to-digital converter (ADC) capability of the client device 200. For example, the low-resolution ADC capability of the client device 200 may comprise a capability for an ADC with one, two, three or four quantization bits.

At least in some embodiments, the first capability indication may further indicate a convergence speed of an automatic gain control (AGC) of the client device 200.

In other words, the first capability indication may indicate the client device 200 capability in terms of low-resolution ADC usage and AGC convergence rate. E.g., the first capability indication may comprise an n-bit signal that the network node device 210 can use to allocate pilot resources (pilot density).

For example, after or during an initial access, the client device 200 may transmit the first capability indication/signal that informs the network node device 210 whether the client device 200 uses low-resolution ADCs (i.e., whether there is need for training), and optionally, e.g., n-bits of information about the AGC convergence speed (to adjust the density of training pilots). These contents of the first capability indication may be separate, or the low-resolution ADC information may be implicit in the AGC convergence speed report, for example.

The instructions, when executed by the at least one processor, further cause the client device 200 at least to perform transmitting, to the network node device 210, a second capability indication indicating whether the client device 200 is capable of receiving signal information associated with low-resolution (e.g., one, two, three or four quantization bits) receiver processing. For example, the signal information may comprise at least one of a signal, a reference signal, a channel with data, or a channel with control information. Alternatively/additionally, the signal information may comprise multi-amplitude modulated signal information.

In other words, the second capability indication may indicate whether the client device 200 can receive multi-amplitude modulations. E.g., the second capability indication may comprise dynamic signaling that the network node device 210 can use to track the ability of the client device 200 to use other than phase-based modulations. At least in some embodiments, this dynamic signaling may be tracked to initiate and terminate the training procedure.

For example, after initial access the client device 200 may report to the network node device 210 whether it can receive multi-amplitude modulations (using, e.g., a one-bit flag). At least in some embodiments, this combined with the first capability indication may inform the network node device 210 of the need for training to adjust the SNR level.

The instructions, when executed by the at least one processor, further cause the client device 200 at least to perform receiving, from the network node device 210, network assistance information generated based on the transmitted first capability indication and second capability indication. For example, the received network assistance information may comprise information about resources and modulation for the receiving of the signal information.

In other words, and as described in more detail in connection with FIGS. 2B and 3, the network node device 210 may make a decision on whether training is needed (i.e., whether the client device 200 needs to use multi-amplitude modulations, and whether it is already capable of doing so). If training is needed, the client device 200 is informed on, e.g., the resources and modulation (i.e., the SNR 'sweet spot') to use, and the adjustment/training procedure may begin. The client device 200 may, e.g., adjust for high initial amplifier gain to ensure signal detection even at a cell edge.

The instructions, when executed by the at least one processor, further cause the client device 200 at least to perform receiving, from the network node device 210, signal information based on the transmitted first capability indication and second capability indication.

At least in some embodiments, the receiving of the signal information may comprise receiving signal information resources at a time interval dependent on the indicated convergence speed of the AGC of the client device 200.

The instructions, when executed by the at least one processor, further cause the client device 200 at least to perform power measurements of the received signal information.

The instructions, when executed by the at least one processor, further cause the client device 200 at least to perform adjusting at least one receiver parameter of the client device 200 based on the received network assistance information and the performed power measurements of the received signal information. For example, the at least one receiver parameter of the client device 200 may comprise a parameter related to the AGC of the client device 200.

At least in some embodiments, the adjusting of the at least one receiver parameter of the client device 200 may comprise adjusting a level of the AGC to determine a range for pre-ADC amplification in which the performed power measurements of the received signal information resources are not saturated.

In other words, once the training begins, the network node device 210 may start to, e.g., transmit pilots with high pilot density (based on how fast the client device 200 AGC converges to a new value), which the client device 200 may measure. Initially, the client device 200 may set the AGC gain high enough to ensure reception even at a cell edge. Then, in between pilots, the client device 200 may, e.g., adjust the AGC by lowering the gain (i.e., 'adding noise') until the received pilot signal powers are no longer saturated, or a suitable range of non-saturated receive pilot powers are found (a range that, for example, may correspond to a given MCS). Furthermore, the client device 200 may, e.g., set a multi-amplitude modulation flag value to 1, and report it to the network node device 210, thereby ending the training.

For example, the network node device 210 may transmit pilots on the designated resources (for example, on CSI-RS resources) for the client device 200 to measure. Depending on the capabilities of the network node device 210 and the client device 200, there may be, e.g., three different implementations on the pilot transmissions, and the associated signaling for each, as will be discussed next.

At least in some embodiments, the receiving of the signal information may comprise receiving a series of signal information resources in time domain with an increasing amplitude profile, and the adjusting of the at least one receiver parameter of the client device 200 may comprise adjusting the at least one receiver parameter of the client device 200 in steps dependent on the performed power measurements of the received signal information resources.

Figure 4:
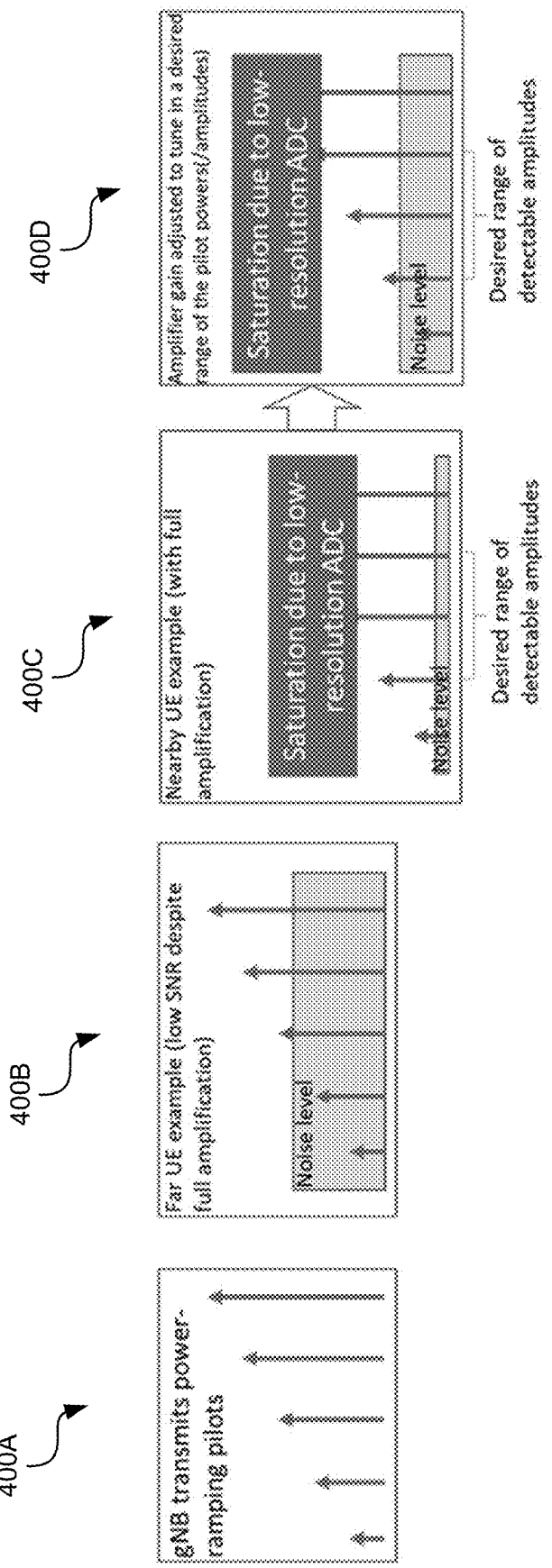
FIG. 4 shows an example embodiment of the subject matter described herein illustrating network node device-side reference signal power ramping with minimal AGC steps.

In other words, the adjusting of the at least one receiver parameter of the client device 200 may comprise network node device 210-side pilot power ramping with minimal AGC steps in which, if possible, the network node device 210 may transmit a series of pilots in time-domain with an increasing amplitude profile (or 'ramp'), see diagram 400A of FIG. 4 for an example. The client device 200 may measure the pilot powers, with knowledge on when the pilot ramp has its lowest and highest powers.

If the measured reference signal power is in full saturation, the client device 200 may need to lower its amplification gain and wait for another pilot ramp.

If some of the measured reference signal powers are in saturation, but a slope in the powers is detectable, the client device 200 may immediately tune its AGC to center on the desired range of powers based on the slope. The gain adjustment may be done, e.g., based on a known pattern of ramping pilots. Thus, even if the slope does not cover the SNR sweet spot, the gain may be adjusted so that the desired range of amplitudes is no longer in saturation (see diagrams 400C-400D of FIG. 4, for a nearby client device 200 example).

If the measured signal information are detectable only at the high end of the pilot ramp, then the client device 200 may most likely be at a cell edge (see diagram 400B of FIG. 4 for an example) and may need the highest amplification to receive anything.

After the AGC adjustment is done, the client device 200 may, e.g., set a multi-amplitude detection flag, and report it to the network node device 210, thus ending the training/adjusting. In case of full saturation of the measured pilot powers, the client device 200 may use, e.g., a feedback signal to inform the network node device 210 that another long series of pilots is needed (i.e., to report back without setting the multi-amplitude flag).

At least in some embodiments, the approach illustrated in FIG. 4 may require the network node device 210 to adjust different amplitudes for different pilots. To keep the spectral power density (i.e., transmit power) constant, the amplitude of other signals may need to be adjusted to compensate or zero-power resources may need to be used in conjunction.

At least in some embodiments, the receiving of the signal information may comprise receiving a series of signal information resources in time domain with a constant power, and the adjusting of the at least one receiver parameter of the client device 200 may comprise adjusting the at least one receiver parameter of the client device 200 between the performed power measurements of the received signal information resources with constant steps.

Figure 5:
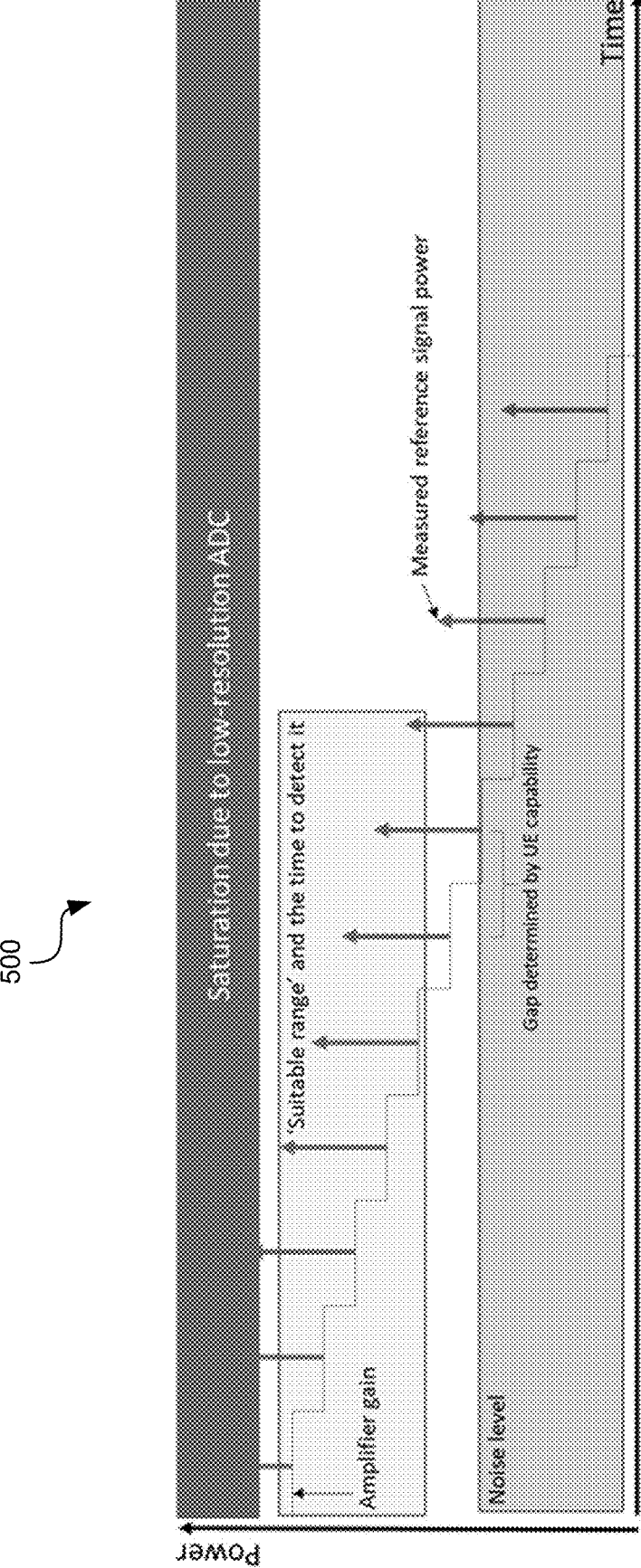
FIG. 5 shows an example embodiment of the subject matter described herein illustrating constant network node device reference signal power, with full AGC adjustment.

In other words, the adjusting of the at least one receiver parameter of the client device 200 may involve constant network node device 210 pilot power with full AGC adjustment, as illustrated in diagram 500 of FIG. 5. When the client device 200 has a fast AGC convergence rate, the network node device 210 may transmit a series of pilots with constant power. The pilot interval may be defined by the first capability indication, i.e., by how quickly the amplifier gain can be adjusted. The client device 200 may measure the pilots, and between each measurement, adjust the amplifier gain lower with constant steps ('AGO sweep'). Once a suitable range of pilot powers has been successfully detected, the client device 200 may, e.g., set a multi-amplitude detection flag, and report it to the network node device 210, thus ending the training/adjustment.

At least in some embodiments, the receiving of the signal information may comprise receiving a series of signal information resources in time domain with an increasing amplitude profile, and the adjusting of the at least one receiver parameter of the client device 200 may comprise adjusting the at least one receiver parameter of the client device 200 between the performed power measurements of the received signal information resources with constant steps.

Figure 6:
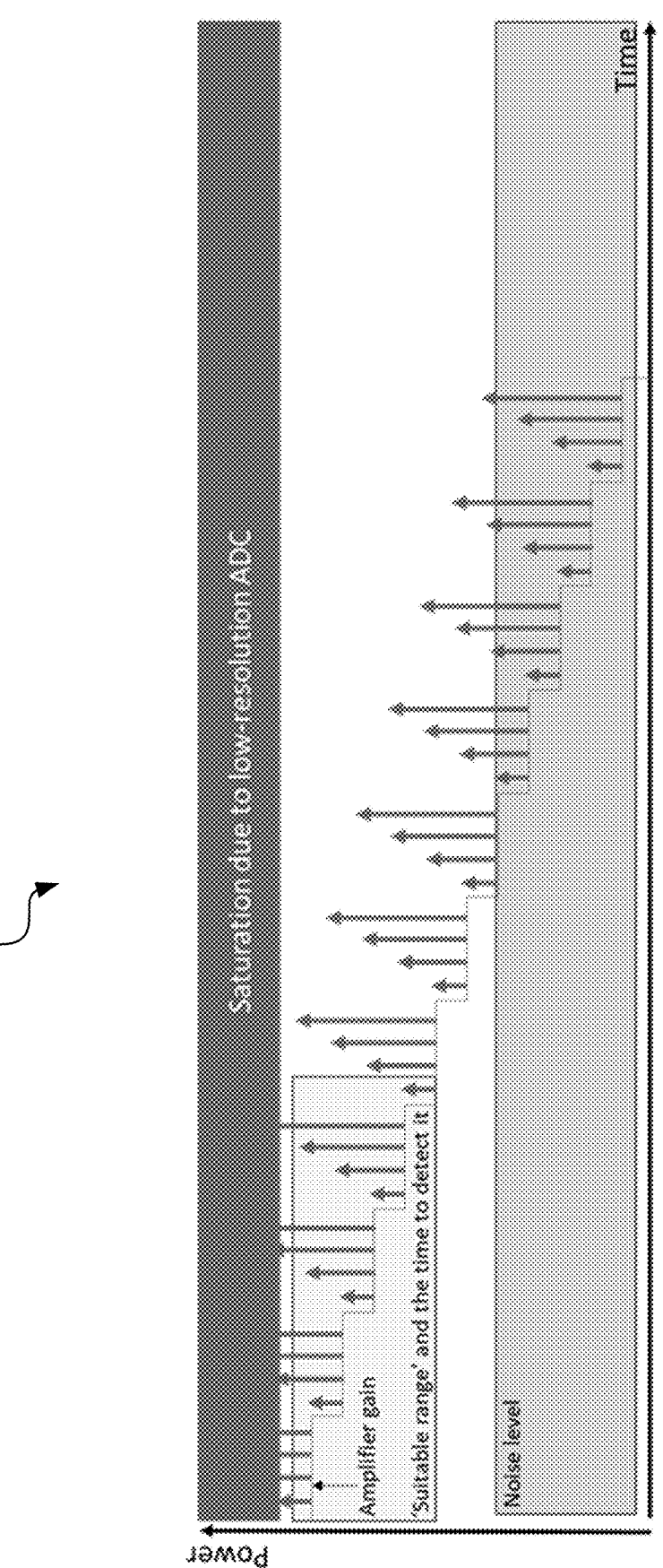
FIG. 6 shows an example embodiment of the subject matter described herein illustrating network node device-side reference signal power ramping, with slow AGC adjustment.

In other words, the adjusting of the at least one receiver parameter of the client device 200 may involve network node device 210-side pilot power ramping with slow AGC adjustment, as illustrated in diagram 600 of FIG. 6. When possible, the network node device 210 may transmit ramping pilots in conjunction with the client device 200 AGC adjustment. This embodiment represents a hybrid between the above two other embodiments and may result at least in some cases in faster SNR tuning for client devices 200 with a slow AGC convergence rate. The network node device 210 may transmit a series of power ramping pilots on repeat, while the client device 200 may adjust its amplifier gain and measure the reference signal powers. Once a desired range of powers has been successfully detected, the client device 200 may, e.g., set a multi-amplitude detection flag, and report it to the network node device 210, thus ending the training/adjustment.

Figure 2B:
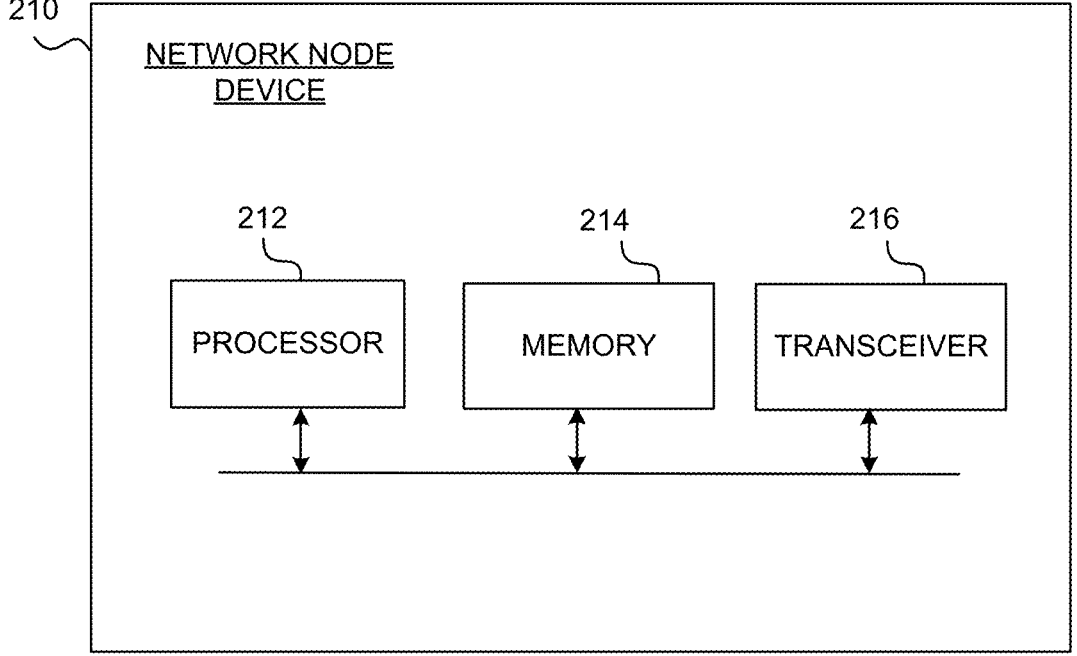
FIG. 2B shows an example embodiment of the subject matter described herein illustrating a network node device.

FIG. 2B is a block diagram of a network node device 210, in accordance with an example embodiment.

The network node device 210 comprises at least one processor 212 and at least one memory 214 including computer program code. The network node device 210 may also include other elements, such as a transceiver 216 configured to enable the network node device 210 to transmit and/or receive information to/from other devices, as well as other elements not shown in FIG. 2B. In one example, the network node device 210 may use the transceiver 216 to transmit or receive signaling information and data in accordance with at least one cellular communication protocol. The transceiver 216 may be configured to provide at least one wireless radio connection, such as for example a 3GPP mobile broadband connection (e.g., 5G or beyond). The transceiver 216 may comprise, or be configured to be coupled to, at least one antenna to transmit and/or receive radio frequency signals.

Although the network node device 210 is depicted to include only one processor 212, the network node device 210 may include more processors. In an embodiment, the memory 214 is capable of storing instructions, such as an operating system and/or various applications. Furthermore, the memory 214 may include a storage that may be used to store, e.g., at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The network node device 210 may comprise a base station. The base station may include, e.g., a fifth-generation base station (gNB) or any such device providing an air interface for client devices to connect to the wireless network via wireless transmissions.

When executed by the at least one processor 212, instructions stored in the at least one memory 214 cause the network node device 210 at least to perform receiving, from the client device 200, the first capability indication indicating at least the low-resolution ADC capability of the client device 200.

The instructions, when executed by the at least one processor, further cause the network node device 210 at least to perform receiving, from the client device 200, the second capability indication indicating whether the client device 200 is capable of receiving the signal information associated with low-resolution receiver processing.

The instructions, when executed by the at least one processor, further cause the network node device 210 at least to perform, in response to determining that adjusting at least one receiver parameter of the client device 200 is needed, generating the network assistance information based on the received first capability indication and second capability indication.

The instructions, when executed by the at least one processor, further cause the network node device 210 at least to perform transmitting, to the client device 200, the generated network assistance information.

In other words, after designating the client device 200 for AGC/threshold training, the network node device 210 may inform the client device 200 on, e.g., the training procedure, resource allocation, and the like.

The instructions, when executed by the at least one processor, further cause the network node device 210 at least to perform transmitting, to the client device 200, the signal information based on the received first capability indication and second capability indication for use in the adjusting of the at least one receiver parameter of the client device 200.

Further features (such as those related to the first capability indication, the second capability indication, and the like) of the network node device 210 directly result from the functionalities and parameters of the client device 200 and thus are not repeated here.

Figure 3:
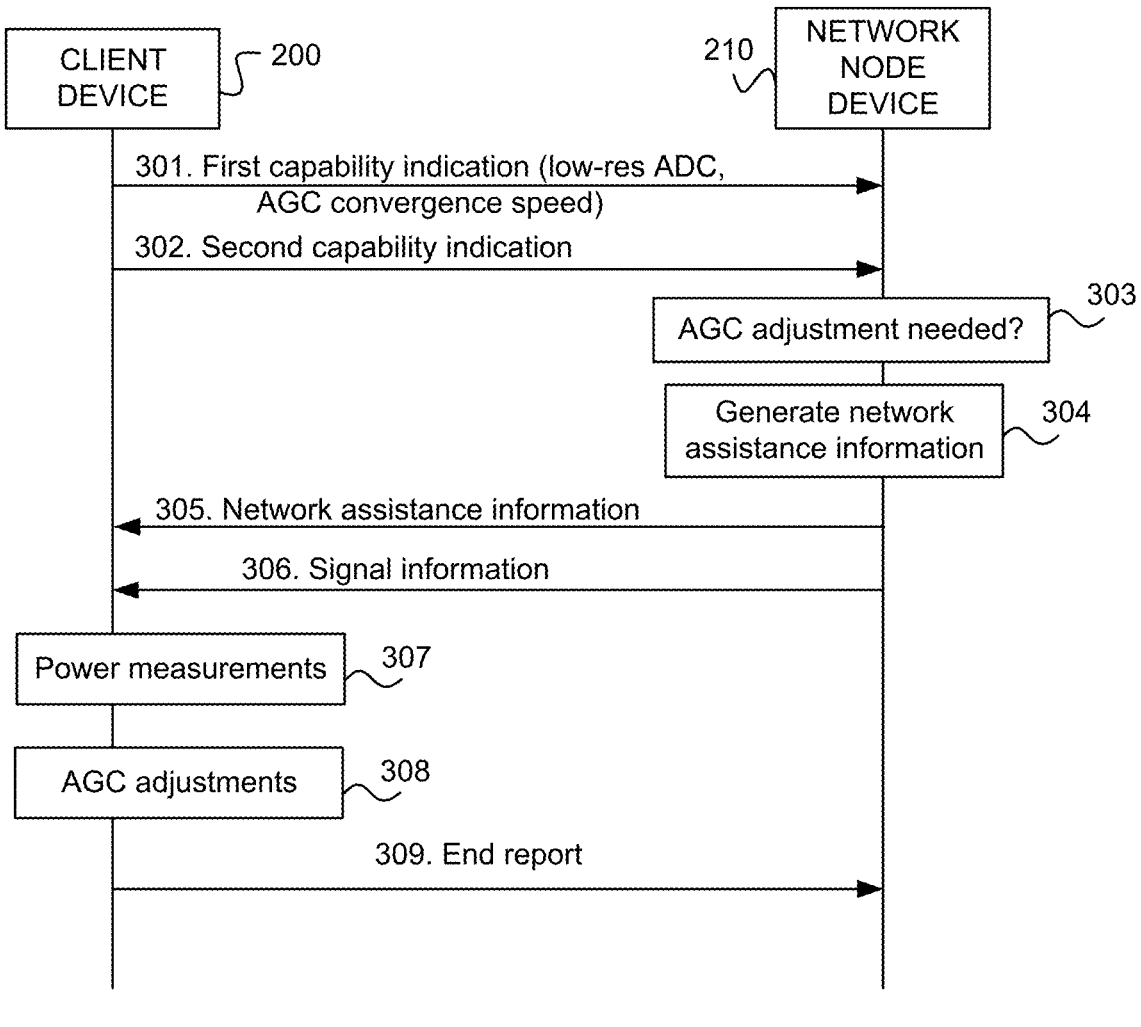
FIG. 3 shows an example embodiment of the subject matter described herein illustrating a method.

FIG. 3 illustrates an example signalling diagram 300 of a method, in accordance with an example embodiment.

At operation 301, the client device 200 transmits to the network node device 210 the first capability indication indicating at least the low-resolution ADC capability of the client device 200. Further in operation 301, the network node device 210 receives the first capability indication.

At operation 302, the client device 200 transmits to the network node device 210 the second capability indication indicating whether the client device 200 is capable of receiving the signal information associated with low-resolution receiver processing. Further in operation 302, the network node device 210 receives the second capability indication.

At operation 303, the network node device 210 determines that adjusting at least one receiver parameter of the client device 200 is needed.

At operation 304, the network node device 210 generates the network assistance information based on the received first capability indication and second capability indication.

At operation 305, the network node device 210 transmits to the client device 200 the generated network assistance information. Further in operation 305, the client device 200 receives the network assistance information.

At operation 306, the network node device 210 transmits to the client device 200 the signal information based on the received first capability indication and second capability indication for use in adjusting at least one receiver parameter of the client device 200. Further in operation 306, the client device 200 receives the signal information.

At operation 307, the client device 200 performs power measurements of the received signal information.

At operation 308, the client device 200 adjusts at least one receiver parameter of the client device 200 based on the received network assistance information and the performed power measurements of the received signal information.

At optional operation 309, the client device 200 may transmit the end report to the network node device 210.

The method of diagram 300 may be performed by the client device 200 of FIG. 2A and the network node device 210 of FIG. 2B. The operations 301-302 can, for example, be performed by the at least one processor 202 and the at least one memory 204 as well as by the at least one processor 212 and the at least one memory 214. The operations 303-304 can, for example, be performed by the at least one processor 212 and the at least one memory 214. The operations 305-306 can, for example, be performed by the at least one processor 212 and the at least one memory 214, as well as by the at least one processor 202 and the at least one memory 204. The operations 307-308 can, for example, be performed by the at least one processor 202 and the at least one memory 204. The operation 309 can, for example, be performed by the at least one processor 202 and the at least one memory 204 as well as by the at least one processor 212 and the at least one memory 214. Further features of the method of diagram 300 directly result from the functionalities and parameters of the client device 200 and the network node device 210, and thus are not repeated here. The method of diagram 300 can be performed by computer program(s).

The client device 200 may comprise means for performing at least one method described herein. In one example, the means may comprise the at least one processor 202, and the at least one memory 204 storing instructions that, when executed by the at least one processor, cause the client device 200 to perform the method.

The network node device 210 may comprise means for performing at least one method described herein. In one example, the means may comprise the at least one processor 212, and the at least one memory 214 storing instructions that, when executed by the at least one processor, cause the network node device 210 to perform the method.

The functionality described herein can be performed, at least in part, by one or more computer program product components such as software components. According to an embodiment, the client device 200 and/or network node device 210 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device, comprising:

at least one processor; and at least one memory storing instructions that, when executed by the at least one processor, cause the client device at least to perform:

transmitting, to a network node device, a first capability indication indicating at least a low-resolution analog-to-digital converter capability of the client device and a convergence speed of an automatic gain control of the client device, wherein the low-resolution analog-to-digital converter capability of the client device comprises a capability for an analog-to-digital converter with one to four quantization bits;

transmitting, to the network node device, a second capability indication indicating whether the client device is capable of receiving signal information associated with low-resolution receiver processing;

reporting, to the network node device, a need for training to adjust a signal-to-noise ratio (SNR) level;

receiving, from the network node device, network assistance information generated based on the transmitted first capability indication and second capability indication, wherein the received network assistance information comprises information about resources and modulation for the receiving of the signal information;

receiving, from the network node device, signal information based on the transmitted first capability indication and second capability indication, wherein the signal information comprises a signal, a reference signal, a channel with data, a channel with control information, and multi-amplitude modulated signal information, wherein the receiving of the signal information comprises receiving signal information resources at a time interval dependent on the indicated convergence speed of the automatic gain control of the client device, receiving a series of signal information resources in time domain with an increasing amplitude profile, and receiving the series of signal information resources in time domain with a constant power;

performing power measurements of the received signal information; and adjusting at least one receiver parameter of the client device based on the received network assistance information and the performed power measurements of the received signal information, wherein the at least one receiver parameter of the client device comprises a parameter related to the automatic gain control of the client device, wherein the adjusting of the at least one receiver parameter of the client device comprises adjusting a level of the automatic gain control to determine a range for pre-analog-to-digital converter amplification in which the performed power measurements of the received signal information resources are not saturated, adjusting the at least one receiver parameter of the client device in steps dependent on the performed power measurements of the received signal information resources, and adjusting the at least one receiver parameter of the client device between the performed power measurements of the received signal information resources with constant steps.

\* \* \* \* \*